United States Patent
Wolfe et al.

(10) Patent No.: US 12,393,786 B2
(45) Date of Patent: Aug. 19, 2025

(54) SYSTEMS AND METHODS FOR FACILITATING INTENT LABELING FOR MACHINE LEARNING MODEL TRAINING

(71) Applicant: Capital One Services, LLC, McLean, VA (US)

(72) Inventors: Nathan Wolfe, Silver Spring, MD (US); Md Arafat Hossain Khan, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 217 days.

(21) Appl. No.: 18/296,948

(22) Filed: Apr. 6, 2023

(65) Prior Publication Data
US 2024/0338528 A1    Oct. 10, 2024

(51) Int. Cl.
*G06F 40/35*    (2020.01)
*G06N 20/00*    (2019.01)

(52) U.S. Cl.
CPC ............. *G06F 40/35* (2020.01); *G06N 20/00* (2019.01)

(58) Field of Classification Search
CPC .......... G06F 40/35; G06N 20/00; G06N 5/01
See application file for complete search history.

(56) References Cited

U.S. PATENT DOCUMENTS

| | | | |
|---|---|---|---|
| 11,158,308 B1* | 10/2021 | Bissell | G10L 15/22 |
| 2021/0150385 A1* | 5/2021 | Mallette | G06F 16/3329 |
| 2022/0084508 A1* | 3/2022 | Kuo | H04L 67/10 |
| 2022/0094648 A1* | 3/2022 | Le | G06F 18/22 |
| 2023/0020613 A1* | 1/2023 | Drory | H04M 3/5191 |
| 2023/0069049 A1* | 3/2023 | Zhou | G06F 40/30 |
| 2024/0020484 A1* | 1/2024 | Will, IV | G06F 3/167 |
| 2024/0177709 A1* | 5/2024 | Creager | G10L 15/22 |

* cited by examiner

*Primary Examiner* — Stella L. Woo
(74) *Attorney, Agent, or Firm* — Foley & Lardner LLP

(57) ABSTRACT

In some embodiments, intent labeling may be facilitated for machine learning model training. In some embodiments, a set of natural language inputs may be obtained. Based on an action set, content related to intent labeling may be presented on a user interface. Based on an entity hierarchy and user selection of an agent-side action of the action set, a first entity subset of entities associated with the agent-side action may be presented on the user interface. Based on the entity hierarchy and user selection of a first entity from the first entity subset, a second entity subset of entities associated with the first entity may be presented on the user interface. Based on user selection of a second entity from the second entity subset, the natural language input may be associated with an ordered intent label that includes the agent-side action, the first entity, and the second entity.

20 Claims, 6 Drawing Sheets

SYSTEMS AND METHODS FOR FACILITATING INTENT LABELING FOR MACHINE LEARNING MODEL TRAINING

SUMMARY

Methods and systems are described herein for improvements related to intent labeling for machine learning model training. As one example, methods and systems are described herein for generating a labeled dataset in which an intent label includes actions or entities that are ordered in the intent label in accordance with an ontology framework. With respect to existing intent labeling systems, for example, given the large size and complexity of a typical intent space, data labelers are frequently unable to uniquely identify the intent labels, which results in the same data being labeled as different intents (e.g., due choice overload, multiple intent labels for the same intent, ambiguity in the intent definitions, etc.). For example, when tasked with labeling natural language utterances of users, the labelers often select a label for a natural language utterance directly from hundreds or thousands of candidate intents available in the intent space.

To address one or more of the foregoing issues, in some embodiments, a system may use an intent ontology to generate intent labels composed of multiple actions or entities subject to a labeling flow hierarchy. When presenting options to a labeler for labeling a data item, the system may present a subset of the available components for an intent label at a first time. Based on a user selection from the presented subset, the system may then present another subset of the available components for the intent label at a second time in accordance with the labeling flow hierarchy. As an example, where the available components include a set of actions and entities for composing intent labels, the system may present a first entity subset of entities associated with a first hierarchy level (e.g., having a higher priority than a second hierarchy level in an entity hierarchy) based on a user selection of an action as part of the intent label. When the user selects a first entity from the first entity subset for the intent label, the system may present a second entity subset of entities associated with the second hierarchy level (e.g., entities associated with the selected first entity). In this way, for example, the system substantially reduces the available entity options via the entity hierarchy, thereby mitigating the issues resulting from choice overload.

Moreover, in some embodiments, while a hierarchy may indicate an order in which an option is presented (e.g., to a labeler) on a user interface to assign an intent label to a data item, the intent label may be generated with different ordering to improve human readability of the intent label (e.g., during labeling or when the label is used to generate machine learning explanations for predictions) or other purposes. As an example, an ordered intent label associated with a natural language input may include an action, a first entity, and a second entity in an order in which the first entity is after the second entity, despite the first entity being associated with a first hierarchy level having a higher priority than a second hierarchy level associated with the second entity. As another example, the ordered intent label may include a first action, a second action, and an entity in an order in which the first action is after the second action, despite the first action being associated with a first hierarchy level having a higher priority than a second hierarchy level associated with the second action.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
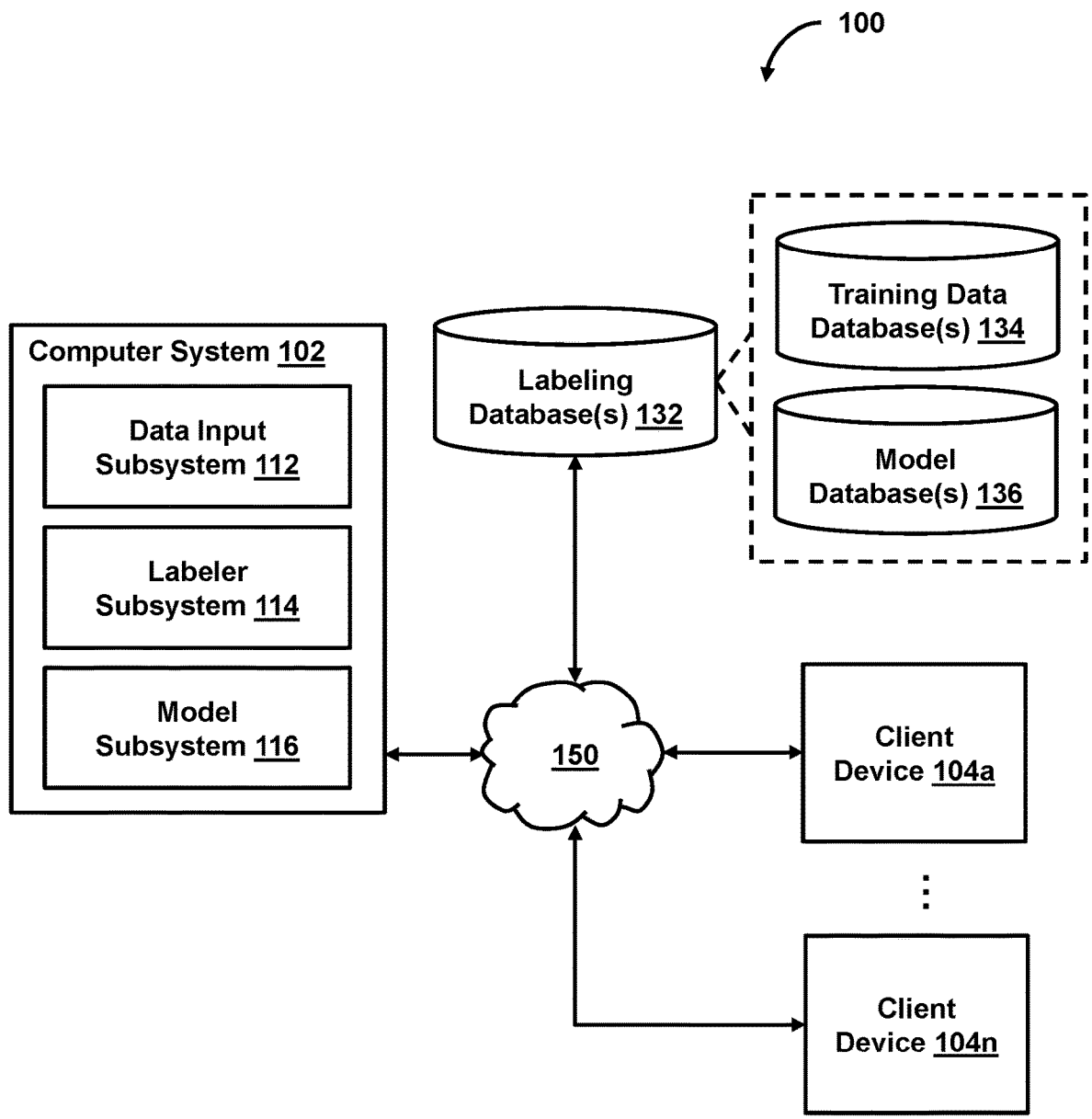
FIG. 1 shows a system for facilitating intent labeling, in accordance with one or more embodiments.

FIG. 1 shows a system 100 for facilitating intent labeling, in accordance with one or more embodiments. As shown in FIG. 1, system 100 may include computer system 102, client device 104 (or client devices 104a-104n), or other components. Computer system 102 may include data input subsystem 112, labeler subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of a client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As indicated above, in some embodiments, system 100 may use an intent ontology to generate intent labels composed of multiple actions or entities subject to a labeling flow hierarchy. For example, the intent ontology may be a framework with a set of rules and categories in an intent space that shows the properties and the relations between an action of an agent and entities on which the action is to be performed (e.g., to accomplish a particular task intended by a customer's natural language utterance or input under consideration by a data labeler).

In some embodiments, when presenting options to a labeler (or a labeler user) for labeling a data item, system 100 may present a subset of the available components for an intent label at a first time. Based on a user selection from the presented subset (e.g., by the labeler user), system 100 may then present another subset of the available components for the intent label at a second time in accordance with the flow labeling hierarchy (e.g., an action hierarchy, an entity hierarchy, etc.). As an example, where the available components include a set of actions and entities for composing intent labels, system 100 may present a first entity subset of entities associated with a first hierarchy level (e.g., having a higher priority than a second hierarchy level in an entity hierarchy) based on a user selection of an action as part of the intent label. When the user selects a first entity from the first entity subset for the intent label, system 100 may present a second entity subset of entities associated with the second hierarchy level (e.g., entities associated with the selected first entity). In this way, for example, system 100 substantially reduces the available entity options via the entity hierarchy, thereby mitigating the issues resulting from choice overload.

In some embodiments, system 100 may generate a labeled dataset in which natural language inputs are associated with one or more ordered intent labels (e.g., where each intent label includes one or more actions, entities, or other descriptors). In some embodiments, system 100 may use the generated labeled dataset to train or configure one or more prediction models. In some embodiments, while a hierarchy may indicate an order in which an option is presented (e.g., to a labeler) on a user interface to assign an intent label to a data item, the intent label may be generated with different ordering to improve human readability of the intent label (e.g., during labeling or when the label is used to generate machine learning explanations for predictions) or other purposes. As an example, an ordered intent label associated with a natural language input may include an action, a first entity, and a second entity in an order in which the first entity is after the second entity, despite the first entity being associated with a first hierarchy level having a higher priority than a second hierarchy level associated with the second entity. As another example, the ordered intent label may include a first action, a second action, and an entity in an order in which the first action is after the second action, despite the first action being associated with a first hierarchy level having a higher priority than a second hierarchy level associated with the second action.

Subsystems 112-116

In some embodiments, data input subsystem 112 may obtain a set of natural language inputs (or other data items to be labeled). As an example, the set of natural language inputs may include one or more natural language utterances, natural language inputs, sign language or other user gestures, or other natural language input. In one use case, during a chat session with a customer service chatbot agent, a user may input one or more natural language utterances, such as "how long until I get my deposit back on a secured card after account closure," or "can I combine my credit accounts."

The foregoing natural language inputs may be obtained by collecting the natural language utterances of users from prior chat sessions with the users. In one use case, data input subsystem 112 may provide the set of natural language inputs to one or more labelers (or labeler users) for the labelers to assign one or more intent labels to the natural language inputs.

In some embodiments, labeler subsystem 114 may cause content related to intent labeling to be presented on a user interface (e.g., to enable a labeler user to assign intent labels to one or more data items). As an example, the presentation of the content on the user interface may be based on an action set that includes one or more agent-side actions, customer-side actions, or other actions. In one use case, the actions may be candidate actions from which the labeler user may select an action to be used as part of an intent label for a given natural language input, and the content presentation may include an interactive presentation that guides the labeler user to select the appropriate action from the action set. As an illustrative example, if a customer user desires to update the user's birthday on record, then the natural language input may be "can I update my date of birth," or "my birthday on this account is wrong, and I would like to fix it." As a further example, the labeler user may select the agent-side action "Update" to reflect an action that would be taken by an agent to address a customer's request (e.g., the customer user's request), where the agent-side action will be part of the intent label "Update_Birthday" for the natural language input in which the customer user's intent is for an agent to update the customer user's date of birth.

In some embodiments, the action set may be part of an action tree, and labeler subsystem 114 may generate the content presentation based on the action tree. As an example, the content may be generated or selected for the content presentation based on nodes of the action tree that corresponding to available actions, nodes of the action tree that correspond to questions directed to the labeler user, edges/branches of the action tree that correspond to available decisions, or other features of the action tree. As another example, content for a workflow may be generated based on the action tree, where an order of the presentation of questions (and whether the questions are presented) is in accordance with the decision pathways of the action tree and the answers of the labeler user to the presented questions of the workflow. As a further example, non-leaf nodes of the action tree may correspond to questions directed to a labeler, and leaf nodes of the action tree may correspond to selectable actions of the action set.

Figure 2A:
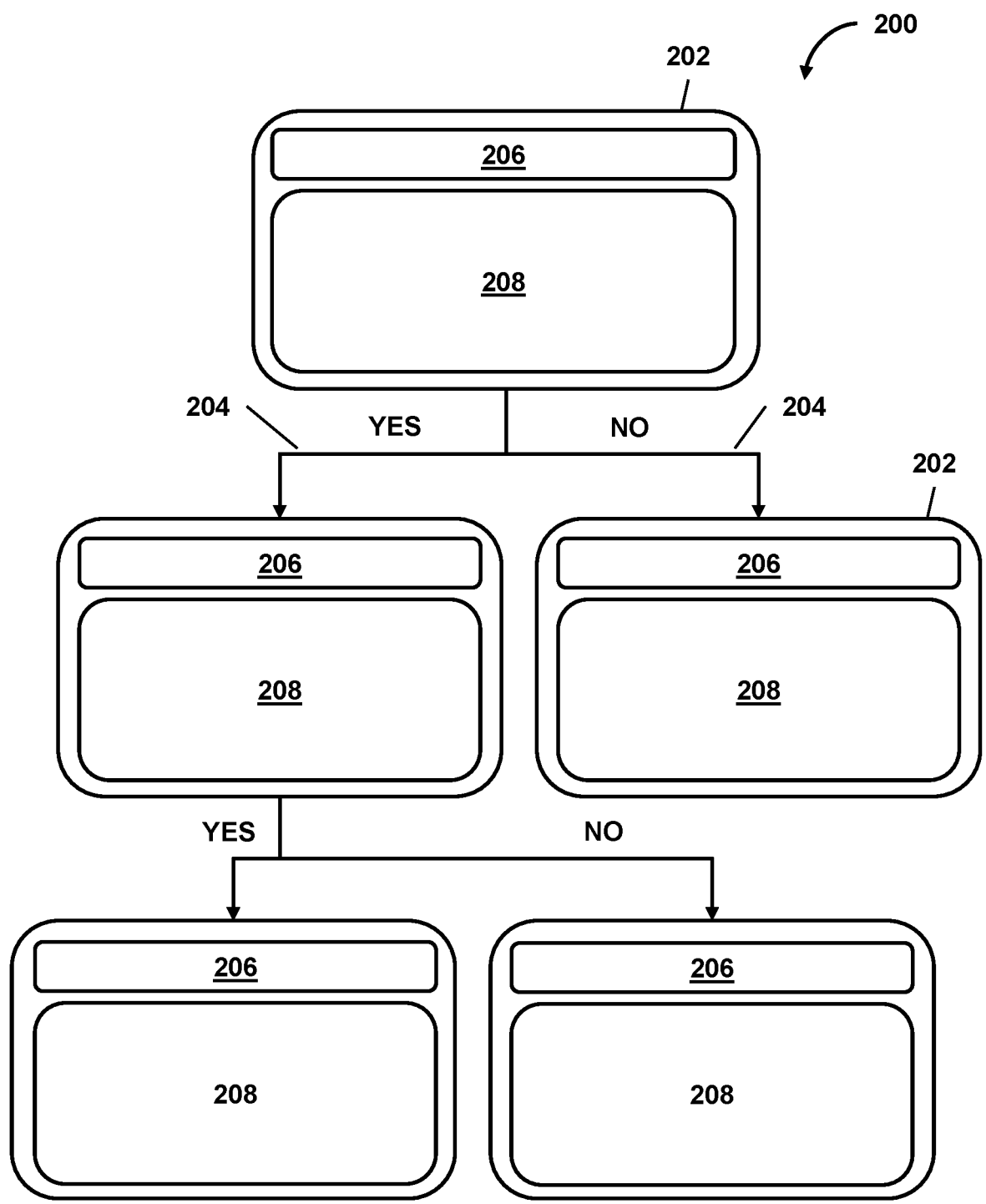
FIG. 2A shows an action tree for facilitating intent labeling, in accordance with one or more embodiments.

In one use case, with respect to FIG. 2A, action tree 200 may include nodes 202 and branches 204, where each node 202 corresponds to a portion of the content presentation (e.g., a different portion of a workflow for the content presentation), and each branch 204 corresponds to a transition to a different next portion of the content presentation (e.g., a different uniform resource locator (URL) or other link to a different next portion of the workflow). In some use cases, each node 202 may correspond to a question and context information related to the question (e.g., a guide for answering "Yes" to the question or answering No to the question). In a further use case, one or more of the nodes 204 may additionally or alternatively correspond to one or more candidate actions that are selectable by the labeler user (e.g., to indicate that a candidate action should be part of an intent label for a natural language input). The candidate actions for such nodes 204 may, for example, be a small subset of the available actions in the action set (e.g., a single action to be confirmed or otherwise selected by the user for an intent label, two to six actions from which the user may selected from for the intent label, etc.). In this way, for example, by reducing the available action options via the action tree 200, the issues resulting from choice overload may be mitigated.

In some scenarios, in response to a first answer of the labeler user to a first question during a first portion of the workflow, a second portion (e.g., including a second question) of the workflow may be selected for presentation to the labeler user based on the second portion being the next node along the branch corresponding to the first answer. In response to a second answer of the labeler user to the second question during the second portion of the workflow, a third portion (e.g., including a third question) of the workflow may be selected for presentation to the labeler user based on the third portion being the next node along the branch corresponding to the second answer, and so on. As an example, when the workflow reaches a leaf node of the action tree, one or more corresponding actions (e.g., that match all of the labeler user's prior answers) may be presented to the labeler user (e.g., as the most-likely actions for the intent label for the natural language input).

In some embodiments, with respect to generation of a given labeled dataset (e.g., for training one or more machine learning models), an action set from which one or more actions are presented to labelers as options to be selected for an intent label (e.g., to be assigned to a natural language input) may be limited to agent-side actions or to consumer-side actions. As an example, the action set may be limited to agent-side actions so that, when assigning labels to natural language inputs, the labelers need only consider the selectable actions from the perspective of an agent (e.g., an autonomous virtual agent or human agent servicing a customer) and the desired action to be taken by the agent. Additionally, or alternatively, intent label ambiguities may be mitigated. As an example, where a customer wants a digital agent to retrieve a statement for the customer, the existence of a customer-side action (e.g., "Download_Statement") and an agent-side action ("Retrieve_Statement") would increase the chances that two labelers assign different intent labels for the same natural language input. Thus, by limiting the action set to either agent-side actions or to consumer-side actions in some embodiments, the frequency in which two labelers assign different labels to the same natural language input may be decreased.

In some embodiments, labeler subsystem 114 may determine one or more subsets of entities to be presented on a user interface (e.g., following a user selection of an action to be part of an intent label for a natural language input, following a user selection of another entity to be part of the intent label, etc.). In some embodiments, content related to intent labeling may be presented on the user interface based on the determined subsets of entities. In one scenario (e.g., like the actions of the action 200 of FIG. 2A), each determined entity subset may be part of an entity tree (or subtree), where each node of the entity tree corresponds to a portion of the content presentation (e.g., a different portion of a workflow for the content presentation), and each branch of the entity tree corresponds to a transition to a different next portion of the content presentation (e.g., a different URL or other link to a different next portion of the workflow). In some use cases, each node of the entity tree may correspond to a question and context information related to the question (e.g., a guide for answering "Yes" to the question or answering No to the question). In a further use case, one or more of the nodes of the entity tree may additionally or alternatively correspond to one or more candidate entities that are selectable by the labeler user (e.g., to indicate that a candidate entity should be part of an intent label for a natural language input).

In some embodiments, labeler subsystem 114 may determine a first subset of entities for a first entity-selection portion of a content presentation, a second subset of entities for a second entity-selection portion of the content presentation, or one or more other subsets of entities for one or more other entity-selection portions of the content presentation. In some embodiments, based on a user selection of an action of an action set via a user interface, labeler subsystem 114 may determine a first entity subset of entities associated with the selected action and present the first entity subset on the user interface. Based on a user selection of a first entity of the first entity subset, labeler subsystem 114 may determine a second entity subset of entities associated with the selected first entity and present the second entity subset on the user interface. As an example, in response to a labeler user selecting the action, a first query for one or more entities associated with the action may be executed, and the first entity subset may be obtained based on the entities of the first entity subset being associated with the action. In response to the labeler user selecting the first entity, a second query for one or more entities associated with the first entity may be executed, and the second entity subset may be obtained based on the entities of the second entity subset being associated with the first entity of the first entity subset.

Figure 2B:
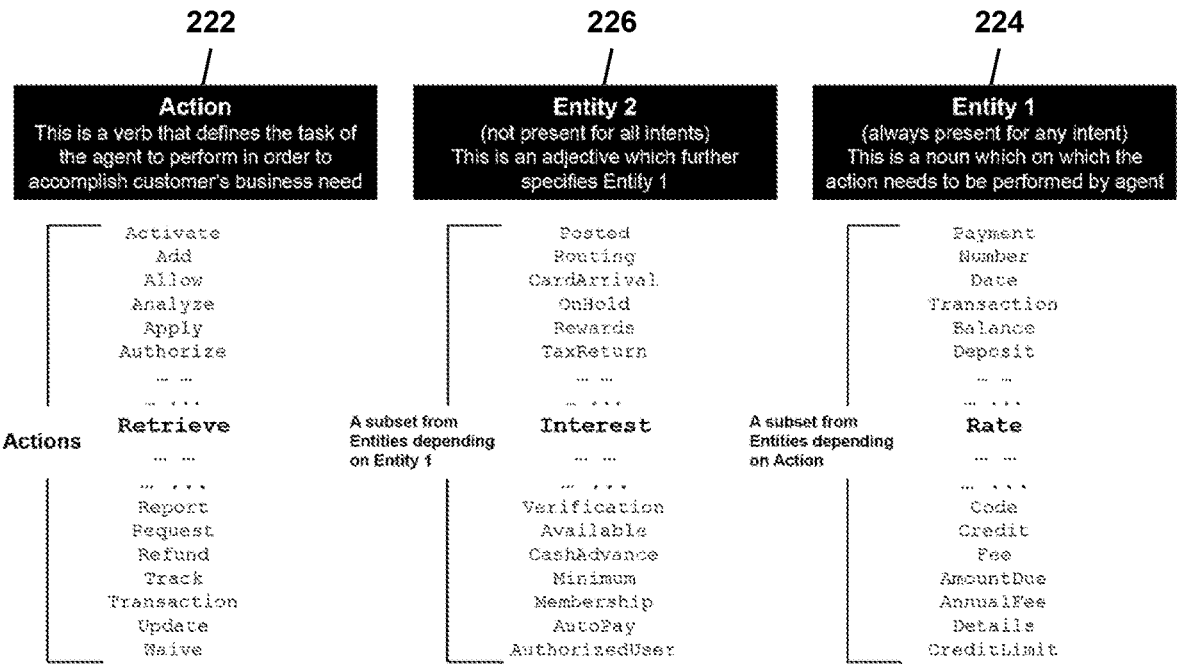
FIG. 2B shows an intent ontology for facilitating intent labeling, in accordance with one or more embodiments.

In one scenario, with respect to FIG. 2B, in response to a labeler user selecting the action "Retrieve" from a list of actions 222, first entity subset 224 (e.g., that includes entities depending on the action "Retrieve") may be determined and presented to the labeler user on a user interface as part of a content portion following a portion of the content presentation involving the action selection. In response to the labeler user selecting the entity "Rate" from the first entity subset 224, second entity subset 226 (e.g., that includes entities depending on the entity "Rate") may be determined and presented to the labeler user on the user interface as part of a content portion following the portion of the content presentation involving the first entity subset selection.

In some embodiments, when presenting options to a labeler (or a labeler user) for labeling a data item, labeler subsystem 114 may present a subset of the available components for an intent label in accordance with a labeling flow hierarchy. As an example, the labeling flow hierarchy may indicate an order in which an option is presented (e.g., to the labeler) on a user interface to assign an intent label to the data item. In one use case, labeler subsystem 114 may present a first action subset as selectable options on the user interface prior to presenting a second action subset (or prior to presenting an entity subset) as selectable options on the user interface based on the first action subset being associated with a first hierarchical level of the hierarchy that is higher than a second hierarchical level of the hierarchy associated with the first action subset (or that is higher than one or more hierarchical levels associated with the entity subset). In another use case, labeler subsystem 114 may present a first entity subset as selectable options on the user interface prior to presenting a second entity subset (or prior to presenting an action subset) as selectable options on the user interface based on the first entity subset being associated with a third hierarchical level of the hierarchy that is higher than a fourth hierarchical level of the hierarchy associated with the second entity subset (or that is higher than one or more hierarchical levels associated with the action subset). In this way, for example, by substantially reducing the available entity options via the hierarchy, issues resulting from choice overload may be mitigated.

In some embodiments, based on an entity hierarchy and a user selection of an action, labeler subsystem 114 may determine a first entity subset of first-level entities associated with the selected action and present the first entity subset on a user interface. Based on the entity hierarchy and a user selection of a first-level entity of the first entity subset, labeler subsystem 114 may determine a second entity subset of second-level entities associated with the selected first-level entity and present the second entity subset on a user interface. As an example, the first entity subset may be determined and presented on the user interface based on (i) the first-level entities being entities associated with a first hierarchical level of the entity hierarchy and (ii) the first-level entities being associated with the selected action. The second entity subset may be determined and presented on the user interface based on (i) the second-level entities being entities associated with a second hierarchical level of the entity hierarchy and (ii) the second-level entities being associated with the selected first-level entity. For example, the second-level entities may not have been considered for the first entity subset because the second hierarchical level (with which the second-level entities are associated) is lower in priority than the first hierarchical level.

In one use case, with respect to FIG. 2B, in response to a labeler user selecting the action "Retrieve" from a list of actions 222, first entity subset 224 (e.g., that includes entities depending on the action "Retrieve") may be retrieved for presentation to the labeler user on a user interface based on (i) the entities of first entity subset 224 being on an "Entity 1" hierarchical level that is higher in priority than the "Entity 2" hierarchical level and (ii) the entities of first entity subset 224 being dependent on the action "Retrieve." After an "Entity 1" entity has been selected by the labeler user, second entity subset 226 (e.g., that includes entities depending on the entity "Rate") may be retrieved for presentation to the labeler user on the user interface based on (i) the entities of second entity subset 226 being on an "Entity 2" hierarchical level that is lower in priority than the "Entity 1" hierarchical level and (ii) the entities of second entity subset 226 being dependent on the entity "Rate." As such, as a result of their respective hierarchical levels, first entity subset 224 is presented as part of a content portion following a portion of the content presentation involving the action selection (e.g., and prior to presenting "Entity 2" entities as selectable options), and second entity subset 226 is presented as part of a content portion following the portion of the content presentation involving the first entity subset selection.

Figure 3:
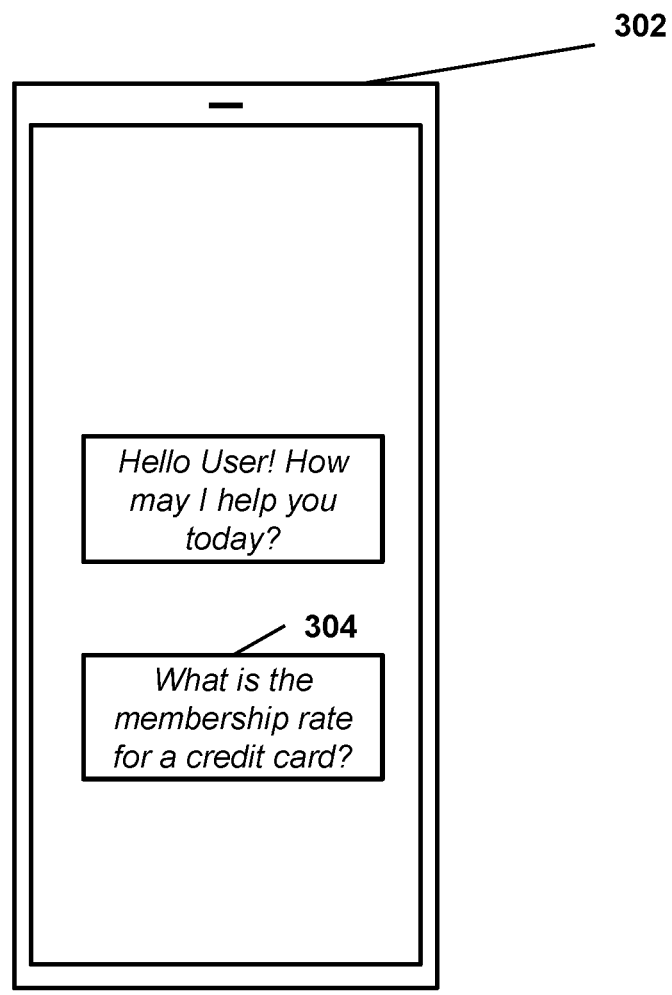
FIG. 3 shows a chat interface interaction between a customer and an agent, in accordance with one or more embodiments.

In another use case, as indicated in FIG. 2B, the entities of first entity subset 224 may be assigned to the first hierarchical level (higher than the second hierarchical level) based on the entities of first entity subset 224 being nouns, and the entities of second entity subset 226 may be assigned to the second hierarchical level (lower than the first hierarchical level) based on the entities of second entity subset 226 being adjectives. In another use case, FIG. 3 illustrates a chat interface interaction between a customer and an agent (e.g., a digital agent, a human agent, etc.) conducted by the customer via a mobile device 302. As an example, natural language input 304 submitted by the customer may be one of the natural language inputs collected by data input subsystem 112. As an illustrative example, if the user would like to learn about a membership rate for a credit card 308, "Rate" may be the noun (e.g., an entity of first entity subset 224 of FIG. 2B) within a first-level entity set and "Membership" may be the adjective (e.g., a potential entity of second entity subset 226 of FIG. 2B) within the second entity set.

In some embodiments, based on user selections of one or more actions or entities for a natural language input (or other data item), labeler subsystem 114 may determine an ordered intent label for the natural language input. In some embodiments, where a labeler user has selected an action, a first-level entity associated with a first hierarchical level, and a second-level entity associated with a second hierarchical level (lower than the first hierarchical level in an entity hierarchy), the ordered intent label may be determined to include the selected action, the selected first-level entity, and the selected second-level entity such that the first-level entity is positioned after the action and the second-level entity in the ordered intent label (e.g., from left to right). The foregoing ordering, in which the first-level entity is after the second-level entity in the ordered intent label, may be performed in some scenarios despite the first-level entity being associated with the first hierarchical level that resulted in the first-level entity being presented prior to the presentation of the second-level entity during the labeling process of the labeler user (e.g., as a result of the first hierarchical level having a higher priority than the second hierarchical level associated with the second-level entity).

In some embodiments, labeler subsystem 114 may generate one or more notifications based on one or more user inputs of one or more labeler users. As an example, based on detecting one or more contrary selections of the labeler users, labeler subsystem 114 may generate an alert indicating a need to correct one or more processes or update one or more systems components. In one use case, if a first set of labelers select a first action for labeling a given natural language input, and a second set of labelers select a second action for labeling the same natural language input, labeler subsystem 114 may generate an alert indicating a potential error (e.g., thereby, notifying one or more administrators that labeling of the natural language input needs to be reperformed, that the questions or context data of an action selection workflow of the labeling process for the labelers needs to be updated, etc.). In this way, for example, the circumstances that caused the labelers to label the natural language input with different actions (e.g., thus, different intent labels) can be addressed.

In some embodiments, where an action tree is used to facilitate user selection of actions by a labeler, the action tree may include non-leaf nodes corresponding to questions directed to labelers. In some embodiments, in response to presenting a first natural language input to a plurality of labelers, labeler subsystem 114 may obtain a first set of user selections indicating a first action (e.g., a first agent-side action) of the action tree as an action related to the first natural language input and a second set of user selections indicating a second action (e.g., a first agent-side action different from the first agent-side action) of the action tree as an action related to the first natural language input. If, for example, it is determined that a threshold number of the labelers selected different actions for the same natural language input, labeler subsystem 114 may generate an error alert indicating one or more items of a non-leaf node of the action tree (e.g., items of a non-leaf node that likely caused some of the labelers to select a different action). As an example, labeler subsystem 114 may detect a location of the action tree (e.g., corresponding to a location within a related workflow) at which the labelers began to diverge from one another and generate the error alert such that the error alert indicates the non-leaf node as a location of the action tree that likely caused such issues (e.g., by specifying the location of the related workflow that likely caused such issues).

In some embodiments, labeler subsystem 114 may determine that a first amount of the user selections (for the first set of user selections) indicating the first action, a second amount of the user selections (for the second set of user selections) indicating the second action, or a sum or other function of the first and second amounts satisfies an amount threshold. Based on such determination, labeler subsystem 114 may generate the error alert related to the non-leaf node of the action tree. It should be noted that the foregoing embodiments are applicable to generating alerts related to other nodes of the action tree. As an example, where one or more leaf nodes also corresponds to questions (e.g., for facilitating selection of an action for a natural language input), labeler subsystem 114 may generate the error alert related to a leaf node of the action tree (e.g., an alert indicating the leaf node as a location of the action tree that likely caused such issues).

In some embodiments, model subsystem 116 may train or configure one or more prediction models to facilitate one or more embodiments described herein. In some embodiments, such models may be used to predict one or more intents (or intent labels) for a natural language input. In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
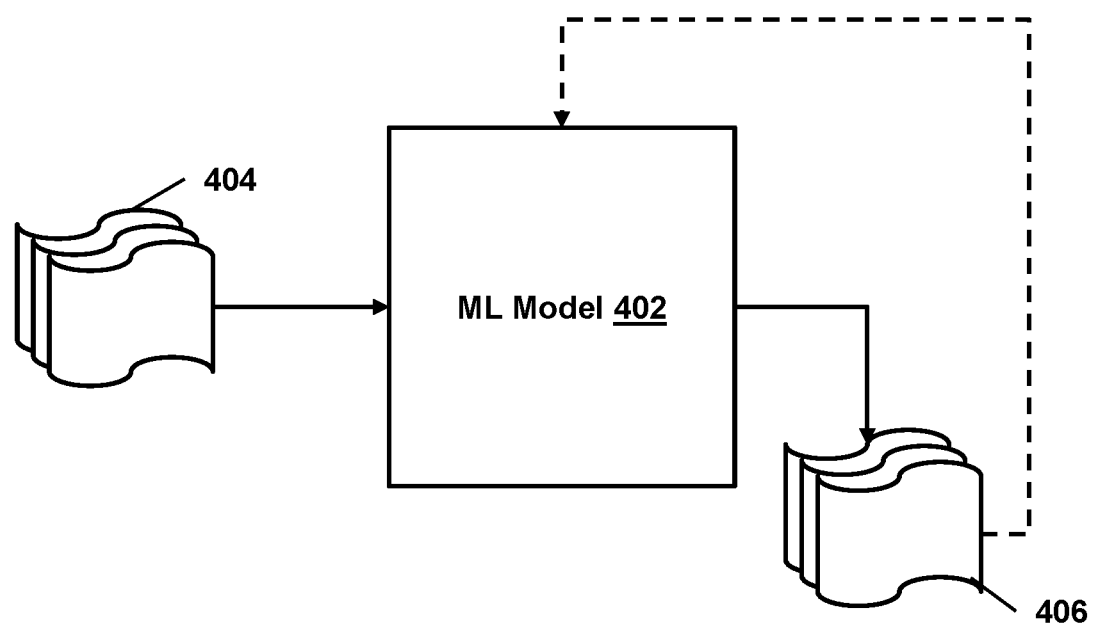
FIG. 4 shows a machine learning model configured to facilitate intent labeling, in accordance with one or more embodiments.

As an example, with respect to FIG. 4, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, with labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). For example, updates to the connection weights may be reflective of the magnitude of error propagated backward after a forward pass has been completed. Thus, in one use case, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bidirectional structure, forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, labeler subsystem 114 may generate a labeled dataset based on intent labels determined for natural language inputs (or other data items) via the techniques described herein. As an example, labeler subsystem 114 may generate the labeled dataset by associating the natural language inputs with the intent labels in the labeled dataset. In some embodiments, labeler subsystem 114 may associate the natural language inputs with intents in a feature vector space to generate the labeled dataset. In some embodiments, labeler subsystem 114 may determine an intent in the feature vector space that corresponds to an intent label (determined for a natural language input) and associate the intent with the natural language input. As an example, labeler subsystem 114 may determine a feature vector representing the intent in the feature vector space and associate the feature vector with the natural language input. As another example, the labeled dataset may include feature vectors representing the intents, and the feature vectors may be associated with the natural language inputs in the labeled dataset.

In some embodiments, a machine learning model may be trained or configured to map the natural language inputs to the intents in the intent feature space. As an example, once the labeled dataset is generated, the machine learning model may be trained based on this data to enable the machine learning model to accurately map the natural language inputs to the correct intents in the feature vector space. For example, the machine learning model is trained to learn the relationship between the natural language inputs and the corresponding intents in the feature vector space. This allows the machine learning model to make predictions about the intent behind a new natural language input. Once the machine learning model is trained, it can then be used to determine the intent behind new, unseen natural language inputs by mapping them to the closest intent in the feature vector space.

In one scenario, with respect to a simple example of training feedforward neural network, natural language inputs may be converted into a numerical format that can be used as input to the neural network, such as converting words in the inputs into numerical word embeddings or other feature vectors (e.g., using a bag-of-words representation or other techniques). The neural network may include an input layer to represent the feature vectors, several hidden layers to learn the relationships between the inputs and the intents, and an output layer with one node for each intent. Once the labeled dataset is generated, the neural network may be trained on the labeled dataset using a fit method of the neural network, as shown in the example TensorFlow pseudo code below.

```
import tensorflow as tf
from tensorflow.keras import layers
model=tf.keras.Sequential( )
model.add (layers.Dense (128, activation='relu', input_dim=input_dim))
model.add (layers.Dense (64, activation='relu'))
model.add (layers.Dense (num_intents, activation='softmax'))
model.compile (optimizer='adam', loss='categorical_crossentropy', metrics=['accuracy'])
model.fit (x_train, y_train, epochs=10, batch_size=32)
```

Example Flowcharts

Figure 5:
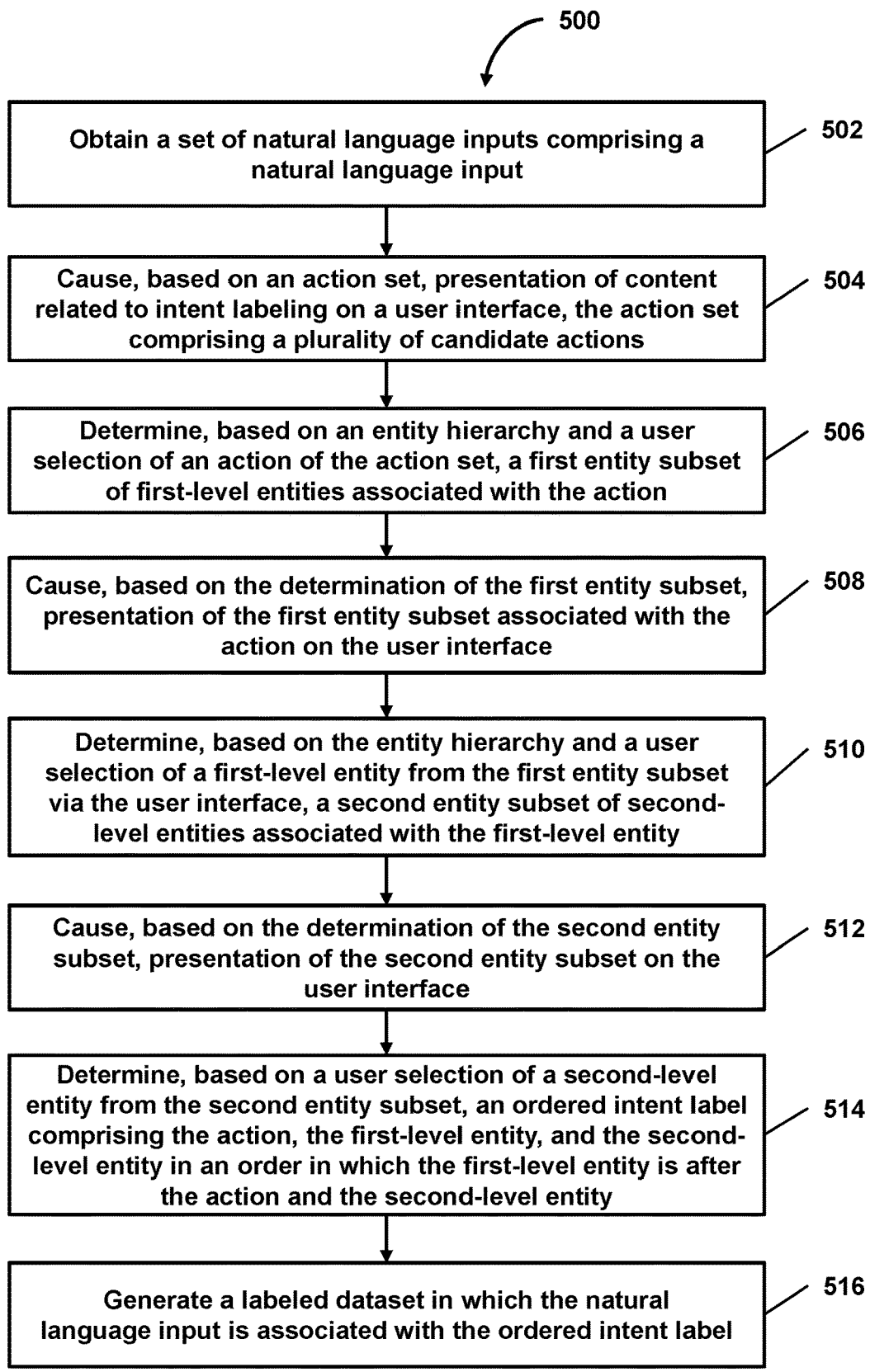
FIG. 5 shows a flowchart of a method of facilitating intent labeling, in accordance with one or more embodiments.

FIG. 5 is an example flowchart of processing operations of a method 500 that enables the various features and functionality of the system as described in detail above. The processing operations of the method presented below are intended to be illustrative and non-limiting. In some embodiments, for example, the method may be accomplished with one or more additional operations not described and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all the operations of the method in response to instructions stored electronically on an electronic storage medium. The processing devices may include one or more devices configured through hardware, firmware, and/or software to be specifically designed for execution of one or more of the operations of the method.

In an operation 502, a set of natural language inputs may be obtained. As an example, the set of natural language inputs may include one or more natural language utterances, natural language text inputs, sign language or other user gestures, or other natural language input. In one use case, during a chat session with a customer service chatbot agent, a user may input one or more natural language utterances, such as "how long until I get my deposit back on a secured card after account closure," or "can I combine my credit accounts?" The foregoing natural language inputs may be obtained by collecting the natural language utterances of users from prior chat sessions with the users. Operation 502 may be performed by a subsystem that is the same as or similar to subsystem 112, in accordance with one or more embodiments.

In an operation 504, content related to intent labeling may be presented on a user interface. For example, the presentation of the content on the user interface may be based on an action set that includes one or more agent-side actions, customer-side actions, or other actions. In one use case, the actions may be candidate actions from which a labeler user may select an action to be used as part of an intent label for a given natural language input, and the content presentation may include an interactive presentation that guides the labeler user to select the appropriate action from the action set. As an illustrative example, if a customer user desires to update the user's birthday on record, then the natural language input may be "can I update my date of birth," or "my birthday on this account is wrong, and I would like to fix it." As a further example, the labeler user may select the agent-side action "Update" to reflect an action that would be taken by an agent to address a customer's request (e.g., the customer user's request), where the agent-side action will be part of the intent label "Update_Birthday" for the natural language input in which the customer user's intent is for an agent to update the customer user's date of birth. Operation 504 may be performed by a subsystem that is the same as or similar to subsystem 112, in accordance with one or more embodiments.

In some embodiments, with respect to operation 504, the action set may be part of an action tree, and the content presentation may be generated based on the action tree (e.g., based on nodes of the action tree that correspond to available actions, nodes of the action tree that correspond to questions directed to the labeler user, edges/branches of the action tree that correspond to available decisions, or other features of the action tree). As an example, content for a workflow may be generated based on the action tree, where an order of the presentation of questions (and whether the questions are presented) is in accordance with the decision pathways of the action tree and the answers of the labeler user to the presented questions of the workflow. In one use case, in response to a first answer of the labeler user to a first question during a first portion of the workflow, a second portion (e.g., including a second question) of the workflow may be selected for presentation to the labeler user based on the second portion being the next node along the branch corresponding to the first answer. In response to a second answer of the labeler user to the second question during the second portion of the workflow, a third portion (e.g., including a third question) of the workflow may be selected for presentation to the labeler user based on the third portion being the next node along the branch corresponding to the second answer, and so on. As an example, when the workflow reaches a leaf node of the action tree, one or more corresponding actions (e.g., that match all of the labeler user's prior answers) may be presented to the labeler user (e.g., as the most-likely actions for the intent label for the natural language input).

In an operation 506, a first entity subset of first-level entities associated with an action of the action set may be determined based on an entity hierarchy and a user selection of the action via the user interface. As an example, in response to the labeler user selecting the action, a query for one or more entities associated with the action may be executed, and the first entity subset may be obtained based on the entities of the first entity subset being associated with the action. As another example, the entity hierarchy may indicate an order in which entities are presented to the labeler user (e.g., on the user interface for assigning an intent label to the natural language input). In one scenario, based on a first hierarchical level being higher in level in the entity hierarchy than a second hierarchical level, entities associated with the first hierarchy level (e.g., first-level entities) may be presented as potential options for an intent label on the user interface before presenting entities associated with the second hierarchical level (e.g., second-level entities). In a further use case, the first entity subset may be determined by performing a query for one or more entities that are associated with both the first hierarchical level and the selected action. Operation 506 may be performed by a subsystem that is the same as or similar to subsystem 114, in accordance with one or more embodiments.

In an operation 508, the first entity subset (e.g., including first-level entities associated with the selected action) may be presented on the user interface based on the determination of the first entity subset. Operation 508 may be performed by a subsystem that is the same as or similar to subsystem 114, in accordance with one or more embodiments.

In an operation 510, a second entity subset of second-level entities associated with a first-level entity (of the first entity subset) may be determined based on the entity hierarchy and a user selection of the first-level entity via the user interface. As an example, in response to the labeler user selecting the first-level entity, a query for one or more entities associated with the first-level entity may be executed, and the second entity subset may be obtained based on (i) the entities of the second entity subset being associated with the first-level entity and (ii) the entities of the second entity subset being associated with the second hierarchical level of the entity hierarchical. In one scenario, the entities of the second entity subset may be selectable entities that are presented to the user after selection of the first-level entity because the entities of the second entity subset are associated with the hierarchical level after the first hierarchical level associated with the selected first-level entity. Operation 510 may be performed by a subsystem that is the same as or similar to subsystem 114, in accordance with one or more embodiments.

In an operation 512, the second entity subset (e.g., including second-level entities associated with the selected first-level entity) may be presented on the user interface. For example, the presentation of the second entity subset may be based on the determination of the second entity subset. Operation 512 may be performed by a subsystem that is the same as or similar to subsystem 114, in accordance with one or more embodiments.

In an operation 514, an ordered intent label may be determined for the natural language input based on a user selection of a second-level entity of the second entity subset via the user interface. As an example, the ordered intent label may include the selected action, the selected first-level entity, and the selected second-level entity such that the first-level entity is positioned after the action and the second-level entity in the ordered intent label. The foregoing ordering in which the first-level entity is after the second-level entity in the ordered intent label may be performed in some scenarios despite the first-level entity being associated with the first hierarchical level that is higher in level (e.g., having a higher priority) in the entity hierarchy than the second hierarchical level associated with the second-level entity. Operation 514 may be performed by a subsystem that is the same as or similar to subsystem 114, in accordance with one or more embodiments.

In an operation 516, a labeled dataset may be generated. As an example, the labeled dataset may be generated such that the natural language input is associated with the intent label in the label dataset. As another example, the labeled data may be used to train or configure one or more machine learning models. Operation 516 may be performed by a subsystem that is the same as or similar to subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: causing, based on an action set, presentation of content related to intent labeling on a user interface, the action set comprising a plurality of candidate actions; determining, based on an entity hierarchy and a user selection of an action of the action set via the user interface, a first entity subset of entities associated with the action for presentation on the user interface, the entity hierarchy indicating a plurality of hierarchy levels that comprises a first hierarchy level and a second hierarchy level lower in level than the first hierarchy level, the first entity subset being associated with the first hierarchy level; determining, based on the entity hierarchy and a user selection of a first entity from the first entity subset via the user interface, a second entity subset of entities associated with the first entity for presentation on the user interface, the second entity subset being associated with the second hierarchy level; and generating a labeled dataset based on a user selection of a second-level entity from the second entity subset via the user interface.

2. The method of the preceding embodiment, wherein generating the labeled dataset comprises generating the labeled dataset in which a natural language input is associated with an ordered-intent label, the ordered intent label comprising the action, the first-level entity, and the second-level entity in an order in which the first-level entity is after the action and the second-level entity.

3. The method of the preceding embodiment, wherein the ordered intent label comprises the action, the first-level entity, and the second-level entity in an order in which the first-level entity is after the action and the second-level entity despite the first-level entity being associated with the first hierarchy level having a higher priority than the second hierarchy level associated with the second-level entity.

4. The method of any of the preceding embodiments, further comprising: obtaining a set of natural language inputs, the set of natural language inputs comprising a natural language input.

5. The method of the preceding embodiment, wherein the natural language input comprises a natural language utterance, and wherein generating the labeled dataset comprises generating the labeled dataset such that the natural language utterance is associated with the ordered intent label in the labeled dataset.

6. The method of any of the preceding embodiments, further comprising: determining an intent in a feature vector space, the intent corresponding to the ordered intent label, wherein generating the labeled dataset comprises associating the natural language input with the intent from the feature vector space.

7. The method of any of the preceding embodiments, wherein the candidate actions of the action set correspond to leaf nodes of an action tree, wherein the action tree comprises non-leaf nodes corresponding to questions directed to a labeler, the method further comprising: in response to presenting a first natural language input to a plurality of labelers, obtaining first user selections indicating a first action of the action tree as an action related to the first natural language input and second user selections indicating a second action of the action tree as an action related to the first natural language input; determining that a first amount of the first user selections indicating the first action or a second amount of the second user selections indicating the second action satisfy an amount threshold; and generating based on the determination that the first amount of the first user selections or the second amount of the second user selections satisfy the amount threshold, an error alert related to one or more items of a non-leaf node of the action tree.

8. The method of the preceding embodiment, wherein the error alert indicates the non-leaf node as a location of the action tree at which the labelers begin to diverge from one another.

9. The method of any of the preceding embodiments, further comprising: training a machine learning model based on the labeled dataset, wherein the machine learning model is configured to map natural language inputs to intents in an intent feature vector space.

10. The method of any of the preceding embodiments, wherein the candidate actions of the action set correspond to leaf nodes of an action tree, wherein the action tree (i) comprises non-leaf nodes corresponding to questions directed to a labeler and (ii) does not comprise non-agent-side actions as leaf nodes of the action tree, and wherein causing the presentation of the content comprises causing, based on the leaf nodes and the non-leaf nodes of the action tree, the presentation of the content related to intent labeling of the natural language input on the user interface.

11. The method of any of the preceding embodiments, wherein determining the first entity subset of entities associated with the action comprises selecting, based on the entity hierarchy indicating that the first hierarchy level is higher in level than the second hierarchy level, the first entity subset of entities associated with the action from a first-level entity set associated with the first hierarchy level rather than from a second-level entity set associated with the second hierarchy level.

12. The method of any of the preceding embodiments, wherein the second hierarchy level has a lower priority than the first hierarchy level.

13. The method of any of the preceding embodiments, wherein the candidate actions comprise candidate agent-side actions.

14. A tangible, non-transitory, machine-readable medium storing instructions that, when executed by a data processing apparatus, cause the data processing apparatus to perform operations comprising those of any of the foregoing method embodiments.

15. A system comprising: one or more processors; and memory storing instructions that, when executed by the processors, cause the processors to effectuate operations comprising those of any of the foregoing method embodiments.

What is claimed is:

1. A system for facilitating user intent labeling of natural language utterances for machine learning model training, the system comprising:
   one or more processors programmed with instructions that, when executed, cause operations comprising:
      in response to obtaining a collection of natural language user inputs comprising a natural language utterance, generating an agent-side action tree of agent-side actions and using the agent-side action tree to generate interactive content related to intent labeling of the natural language utterance for presentation on a user interface, the agent-side action tree comprising a plurality of candidate agent-side actions as leaf nodes of the agent-side action tree without comprising non-agent-side actions;
      in response to a user selection of an agent-side action corresponding to a leaf node of the agent-side action tree via the user interface, selecting, using an entity hierarchy and the agent-side action tree, from a first-level entity set, a first entity subset of first-level entities associated with the agent-side action for presentation on the user interface, the entity hierarchy indicating a plurality of hierarchy levels that comprises a first hierarchy level and a second hierarchy level having a lower priority than the first hierarchy level;
      in response to a user selection of a first-level entity from the first entity subset associated with the agent-side action via the user interface, selecting, using the entity hierarchy and the first-level entity, from a second-level entity set, a second entity subset of second-level entities associated with the first-level entity for presentation on the user interface;
      in response to a user selection of a second-level entity from the second entity subset via the user interface, determining, for the natural language utterance, an ordered intent label comprising the agent-side action, the first-level entity, and the second-level entity in an order in which the first-level entity is after the agent-side action and the second-level entity, despite the first-level entity being associated with the first hierarchy level having a higher priority than the second hierarchy level associated with the second-level entity; and
      generating, for training one or more machine learning models, a labeled training dataset in which the natural language utterance is labeled with the ordered intent label.

2. The system of claim 1, the operations further comprising:
   obtaining, via a chat application, the collection of natural language user inputs; and
   training a machine learning model using the labeled training dataset, wherein the machine learning model is configured to map natural language user inputs to intents in an intent feature vector space.

3. A method comprising:
   obtaining a set of natural language inputs, the set of natural language inputs comprising a natural language input;
   causing, based on an action tree of agent-side actions, presentation of content related to intent labeling of the natural language input on a user interface, the action tree comprising a plurality of candidate agent-side actions as leaf nodes of the action tree;
   determining, based on an entity hierarchy and a user selection of an agent-side action corresponding to a leaf node of the action tree via the user interface, a first entity subset of first- level entities associated with the agent-side action, the entity hierarchy indicating a plurality of hierarchy levels that comprises a first hierarchy level and a second hierarchy level lower in level than the first hierarchy level;
   causing, based the first entity subset, presentation of the first entity subset associated with the agent-side action on the user interface;
   determining, based on the entity hierarchy and a user selection of a first-level entity from the first entity subset via the user interface, a second entity subset of second-level entities associated with the first-level entity;
   causing, based on the second entity subset, presentation of the second entity subset on the user interface;
   determining, based on a user selection of a second-level entity from the second entity subset via the user interface, an ordered intent label comprising the agent-side action, the first-level entity, and the second-level entity in an order in which the first-level entity is after the agent-side action and the second-level entity; and
   generating a labeled dataset in which the natural language input is associated with the ordered intent label.

4. The method of claim 3, further comprising:
   determining an intent in a feature vector space, the intent corresponding to the ordered intent label,
   wherein generating the labeled dataset comprises associating the natural language input with the intent from the feature vector space.

5. The method of claim 3, wherein the action tree is a binary action tree comprising non-leaf nodes corresponding to questions directed to a labeler, the method further comprising:
   in response to presenting a first natural language input to a plurality of labelers, obtaining first user selections indicating a first agent-side action of the action tree as an action related to the first natural language input and second user selections indicating a second agent-side action of the action tree as an action related to the first natural language input;
   determining that a first amount of the first user selections indicating the first agent-side action or a second amount of the second user selections indicating the second agent-side action satisfies an amount threshold; and generating, based on the first amount of the first user selections or the second amount of the second user selections being determined to satisfy the amount threshold, an error alert indicating one or more items of a non-leaf node of the action tree.

6. The method of claim 5, wherein the error alert indicates the non-leaf node as a location of the action tree at which the plurality of labelers begin to diverge from one another.

7. The method of claim 3, wherein the natural language input comprises a natural language utterance, and
wherein generating the labeled dataset comprises generating the labeled dataset such that the natural language utterance is associated with the ordered intent label in the labeled dataset.

8. The method of claim 3, further comprising:
training a machine learning model based on the labeled dataset, wherein the machine learning model is configured to map natural language inputs to intents in an intent feature vector space.

9. The method of claim 3, wherein the action tree comprises non-leaf nodes corresponding to questions directed to a labeler, and wherein the action tree does not comprise non-agent-side actions as leaf nodes of the action tree.

10. The method of claim 3, wherein determining the first entity subset associated with the agent-side action comprises selecting, based on the entity hierarchy indicating that the first hierarchy level is higher in level than the second hierarchy level, the first entity subset associated with the agent-side action from a first-level entity set associated with the first hierarchy level rather than from a second-level entity set associated with the second hierarchy level.

11. The method of claim 3, wherein the second hierarchy level has a lower priority than the first hierarchy level.

12. One or more non-transitory computer-readable media storing instructions that, when executed by one or more processors, cause operations comprising:
obtaining a set of natural language inputs comprising a natural language input;
causing, based on an action set, presentation of content related to intent labeling on a user interface, the action set comprising a plurality of candidate agent-side actions;
determining, based on an entity hierarchy and a user selection of an agent-side action of the action set via the user interface, a first entity subset of entities associated with the agent-side action for presentation on the user interface, the entity hierarchy indicating a plurality of hierarchy levels that comprises a first hierarchy level and a second hierarchy level lower in level than the first hierarchy level, the first entity subset being associated with the first hierarchy level;
determining, based on the entity hierarchy and a user selection of a first entity from the first entity subset via the user interface, a second entity subset of entities associated with the first entity for presentation on the user interface, the second entity subset being associated with the second hierarchy level; and
generating, based on a user selection of a second entity from the second entity subset via the user interface, a labeled dataset in which the natural language input is associated with an ordered intent label, the ordered intent label comprising the agent-side action, the first entity, and the second entity in an order in which the first entity is after the agent-side action and the second entity.

13. The one or more media of claim 12, wherein the operations further comprising:
determining an intent in a feature vector space, the intent corresponding to the ordered intent label,
wherein generating the labeled dataset comprises associating the natural language input with the intent from the feature vector space.

14. The one or more media of claim 12, wherein the plurality of candidate agent-side actions of the action set correspond to leaf nodes of an action tree, wherein the action tree comprises non-leaf nodes corresponding to questions directed to a labeler, the operations further comprising:
in response to presenting a first natural language input to a plurality of labelers, obtaining first user selections indicating a first agent-side action of the action tree as an action related to the first natural language input and second user selections indicating a second agent-side action of the action tree as an action related to the first natural language input;
determining that a first amount of the first user selections indicating the first agent-side action or a second amount of the second user selections indicating the second agent-side action satisfy an amount threshold; and
generating based on the first amount of the first user selections or the second amount of the second user selections being determined to satisfy the amount threshold, an error alert related to one or more items of a non-leaf node of the action tree.

15. The one or more media of claim 14, wherein the error alert indicates the non-leaf node as a location of the action tree at which the plurality of labelers begin to diverge from one another.

16. The one or more media of claim 12, wherein the natural language input comprises a natural language utterance, and
wherein generating the labeled dataset comprises generating the labeled dataset such that the natural language utterance is associated with the ordered intent label in the labeled dataset.

17. The one or more media of claim 12, the operations further comprising:
training a machine learning model based on the labeled dataset, wherein the machine learning model is configured to map natural language inputs to intents in an intent feature vector space.

18. The one or more media of claim 12, wherein the plurality of candidate agent-side actions of the action set correspond to leaf nodes of an action tree, wherein the action tree (i) comprises non-leaf nodes corresponding to questions directed to a labeler and (ii) does not comprise non-agent-side actions as leaf nodes of the action tree, and
wherein causing the presentation of the content comprises causing, based on the leaf nodes and the non-leaf nodes of the action tree, the presentation of the content related to intent labeling of the natural language input on the user interface.

19. The one or more media of claim 12, wherein determining the first entity subset of entities associated with the agent-side action comprises selecting, based on the entity hierarchy indicating that the first hierarchy level is higher in level than the second hierarchy level, the first entity subset of entities associated with the agent-side action from a first-level entity set associated with the first hierarchy level rather than from a second-level entity set associated with the second hierarchy level.

20. The one or more media of claim 12, wherein the second hierarchy level has a lower priority than the first hierarchy level.

\* \* \* \* \*